B. SOROCINSKY.
WIRE CUTTER.
APPLICATION FILED JUNE 14, 1918.
1,290,674.
Patented Jan. 7, 1919.
2 SHEETS—SHEET 1.
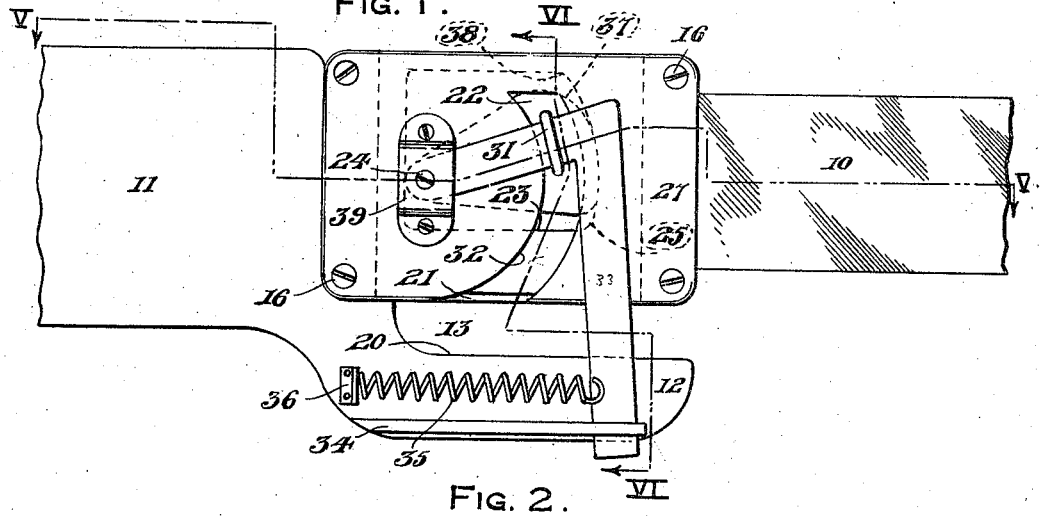
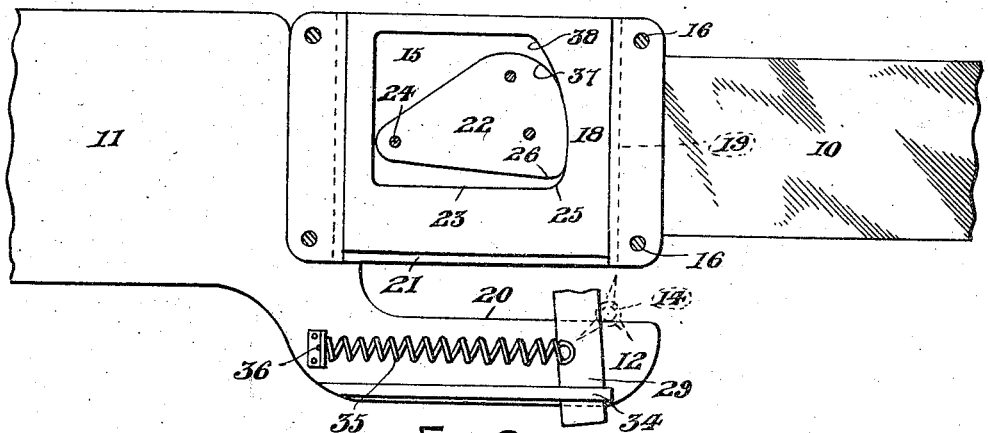
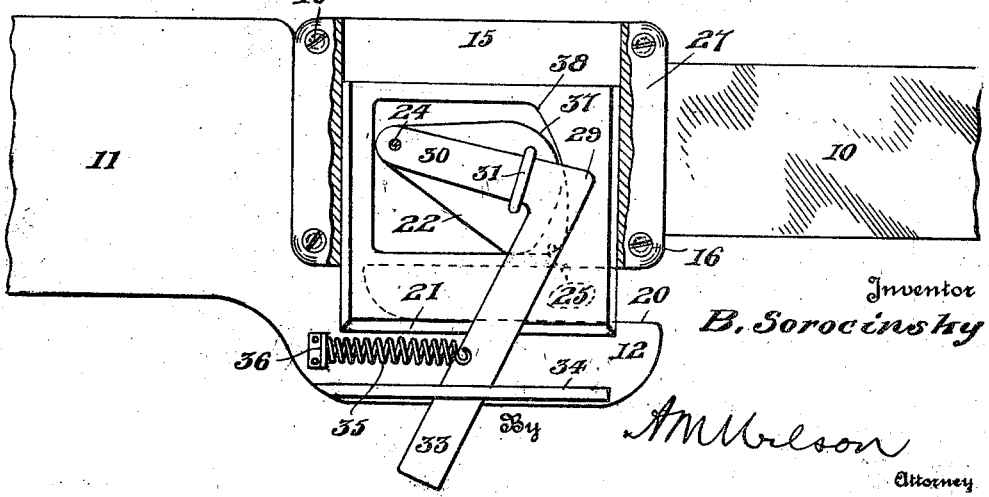
Inventor
B. Sorocinsky
By A. M. Wilson
Attorney

B. SOROCINSKY.
WIRE CUTTER.
APPLICATION FILED JUNE 14, 1918.

1,290,674.

Patented Jan. 7, 1919.
2 SHEETS—SHEET 2.

Inventor
B. Sorocinsky

By A. M. Wilson
Attorney

UNITED STATES PATENT OFFICE.

BRONISLAW SOROCINSKY, OF COSMOPOLIS, WASHINGTON.

WIRE-CUTTER.

1,290,674.   Specification of Letters Patent.   Patented Jan. 7, 1919.

Application filed June 14, 1918. Serial No. 239,920.

*To all whom it may concern:*

Be it known that I, BRONISLAW SOROCINSKY, a citizen of Russia, residing at Cosmopolis, in the county of Grays Harbor and State of Washington, have invented certain new and useful Improvements in Wire-Cutters, of which the following is a specification.

The primary object of the invention is the provision of a wire cutter provided in connection with a spear or knife whereby wires may be readily severed permitting a person to pass through an obstruction formed by the wires and often arranged as a barbed wire entanglement.

A further object of the invention is the provision of a wire cutter that is light in weight and can be provided upon any suitable article without taking up any appreciable amount of room, the same also serving as a mount for bayonet or blade when desired.

A still further object of the invention is the provision of a wire cutter adapted for operation in actively cutting wires without requiring the manual operation of pivoted members as required with the usual pair of shears, the cutting operation being accomplished by forcibly engaging a portion of the device against an article to be cut.

In the drawings:—

Figure 1 is a side elevation of the device mounted upon a bayonet;

Fig. 2 is a similar view thereof with the top plate and other elements removed, a wire being indicated by dotted lines in its cutting position;

Fig. 3 is a view similar to Fig. 1 with the cover plate broken away and the device illustrated in its operative cutting position;

Figure 4:
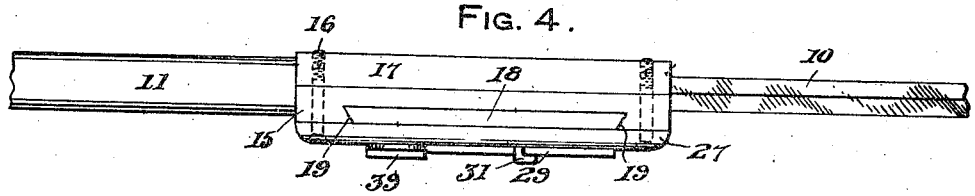
Fig. 4 is a plan view of the device.
Figure 5:
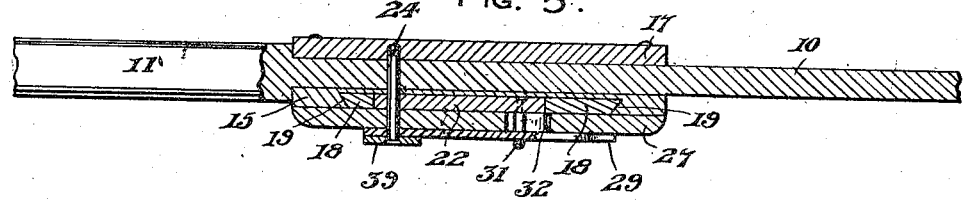
Fig. 5 is a sectional view taken upon line V—V of Fig. 1.
Figure 6:
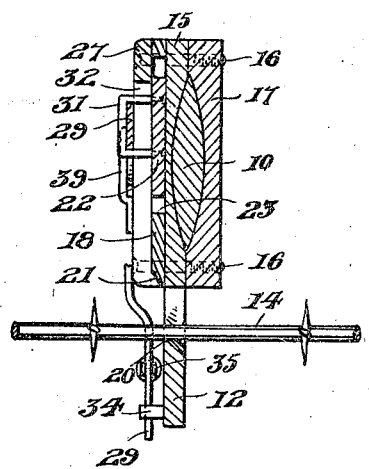
Fig. 6 is a transverse sectional view thereof taken upon line VI—VI of Fig. 1 with a wire illustrated in its operative position.
Figure 7:
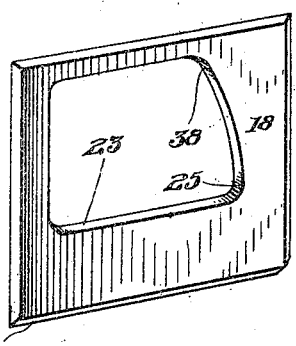
Fig. 7 is a perspective view of the cutting plate removed.
Figure 8:
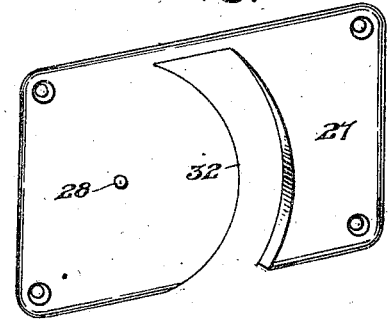
Fig. 8 is a perspective view of the cover plate detached.
Figure 9:
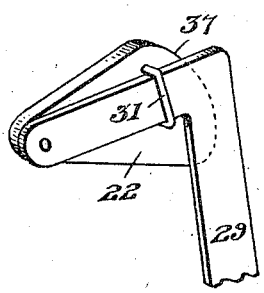
Fig. 9 is a perspective view of the operating cam and lever detached from the device.

My device for cutting wires may be readily mounted upon a sword, gun or similar implement and is herein illustrated mounted upon a bayonet or blade 10 having a shank or handle 11. A finger 12 is provided upon the shank 11 providing a receiving slot 13 for the wire such as 14 between the said finger and the adjacent portion of the device. Said finger 12 may be carried by a base plate 15 if desired, which plate is secured to one face of the bayonet 10 by means of screws 16 passing through the plate 15 and through a similar plate 17 upon the opposite side of the bayonet 10 and whereby the device is fixed to the said bayonet.

The base plate 15 is provided with a rectangular cutting blade 18 slidably mounted in a transverse dove-tailed groove 19 for movement toward and away from the finger 12. The inner edge 20 of said finger is preferably sharpened to coöperate with the adjacent edge 21 of the blade 18 for shearing a wire 14 when positioned within the slot 13 in the path of movement of said blade 18.

A cam 22 is pivoted within an opening 23 of the blade 18 by means of a post 24, the said opening being substantially rectangular with a rounded corner 25 so that upon revolving the cam 22 from the position shown in Fig. 2 to that shown in Fig. 3, the toe 26 of the cam 22 will engage one side of the opening 23 for operatively shifting the blade 18. A cover plate 27 is mounted upon the base plate 15 by the aforementioned screws 16 with the post 24 outwardly extending through a perforation 28 in said cover plate. An angular operating lever 29 is journaled adjacent the upper end of the post 24 by means of its shorter arm 30, which arm is connected by a staple 31 with the cam 22. The staple 31 is freely positioned for movement through a curved slot 32 in the cover plate 27, while the other longer arm 33 of the lever 29 projects across the wire receiving slot 13 and beneath a U-shaped guide 34 provided adjacent the outer edge of the finger 12.

A spring 35 is positioned between the lever arm 33 and a lug 36 carried adjacent the base of the finger 12 for normally holding the lever 29 with the blade 18 retracted. During the operation of the device, the shank 11 being grasped by the soldier the wire 14 is forced inwardly of the slot 13 against the lever arm 33 which swings upon the pivot post 24 shifting the blade 18 toward the finger 12 and shearing the wire 14 between the cutting edges 20 and 21. After the wire has been severed, the spring 35 returns the lever 29 to its normal position and by placing the curved face 37 of the cam 22 against the curved side 38 of the blade opening 23, the blade is also retracted to its normal position as shown in Figs. 1 and 2 of the drawings, although it will be apparent that the blade 18 may be retracted within the groove 19 by the hand of the operator if desired. A guard 39 is provided upon the cover plate 27 for receiving the outer headed end of the post 24 and overlying the pivoted end of the lever 29. A strong and compact device is provided adapted for readily outting wires upon a forward thrust imparted to the shank 11 by the soldier in charge of the device.

What I claim as new is:—

1. A wire cutter comprising a shank, a base plate carried by the shank having a groove therein, a finger upon the shank having a cutting edge spaced from said plate forming a wire receiving slot therebetween, a blade slidably mounted in said groove having an opening therein, an operating cam for said blade pivoted within the opening of the blade and adapted for shifting the blade toward said finger upon the rotation of the cam in one direction, and an operating lever for the cam projecting transversely of said slot adapted for engagement by a wire position for cutting within said slot.

2. A wire cutter comprising a shank, a base plate carried by the shank having a groove therein, a finger upon the shank having a cutting edge spaced from said plate forming a wire receiving slot therebetween, a blade slidably mounted in said groove having an opening therein, an operating cam for said blade pivoted within the opening of the blade and adapted for shifting the blade toward said finger upon the rotation of the cam in one direction, a cover plate upon said base plate overlying said blade and cam, an angular lever having one arm pivoted above said cover plate, a staple connecting the said lever and cam movable through a slot provided in said cover plate, a guide upon said finger overlying the lever, and a return spring for the lever.

3. A device of the class described comprising in combination with a shank, a bayonet projecting therefrom, a base plate and a rear plate secured together and positioned upon opposite sides of the bayonet, a transverse dovetailed slot through said base plate, a cutting blade slidably mounted in said slot having a cam opening therein, a cover plate upon said base plate overlying the blade with a curved slot above said opening, a finger carried by said shank spaced from said base plate forming a receiving slot therebetween and having an inner cutting edge, a pivot post extending through said cover and base plates, a cam within said opening pivoted upon said post, an angular lever pivoted to the post above said cover plate and having an angular arm positioned over the said wire receiving slot adapted for engagement with a wire during the operation of the device, a staple carried by said cam and extending through said curved slot overlying said lever and the return spring for the lever.

4. In combination with a mounting member, a finger having a cutting edge spaced therefrom, a base plate upon said mounting member having a guide slot therein, a blade within said slot shiftable toward and away from the said finger and having a cam opening therein, a cover plate upon said base plate overlying the opening and having a curved slot opening adjacent the said finger, a cam pivotally mounted in said opening between said plates, an operating lever for the cam pivoted above the cover plate and connected to the cam through said curved slot of the latter, the said lever projecting across the opening between the finger and mounting member adapted upon engagement with a wire to shift said blade toward said finger whereby the wire is severed by engagement with said blade and finger.

5. In combination with a mounting member, a finger having a cutting edge spaced therefrom, a base plate upon said mounting member having a guide slot therein, a blade within said slot shiftable toward and away from the said finger and having a cam opening therein, a cover plate upon said base plate overlying the opening and having a curved slot opening adjacent the said finger, a cam pivotally mounted in said opening between said plates, an operating lever for the cam pivoted above the cover plate and connected to the cam through said curved slot of the latter, the said lever projecting across the opening between the finger and mounting member adapted upon engagement with a wire to shift said blade toward said finger whereby the wire is severed by engagement with said blade and finger, a U-shaped guide adjacent the outer edge of the finger overlying said lever, a lug adjacent the base of the finger and a spring between said lug and lever adapted for returning the lever and cam to its normal position.

In testimony whereof I affix my signature.

BRONISLAW SOROCINSKY.